Sept. 14, 1965 S. W. MILITELLO 3,206,054
BABY FOOD FEEDER
Filed Jan. 5, 1962 2 Sheets-Sheet 1
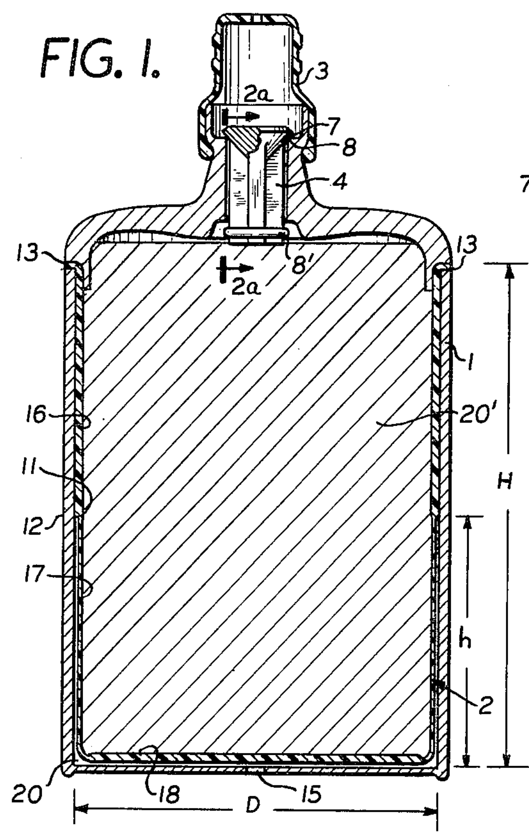
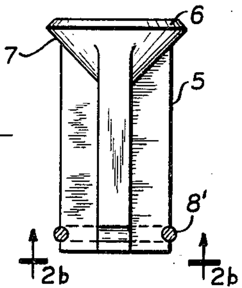
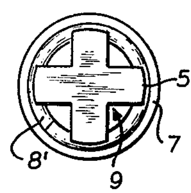
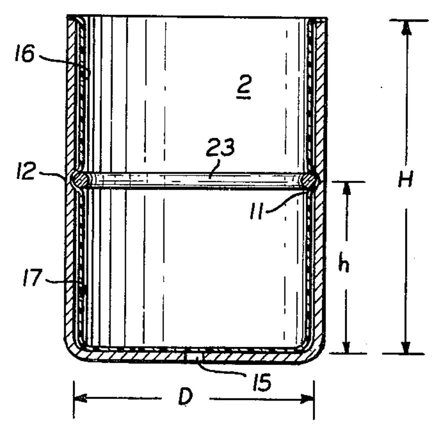
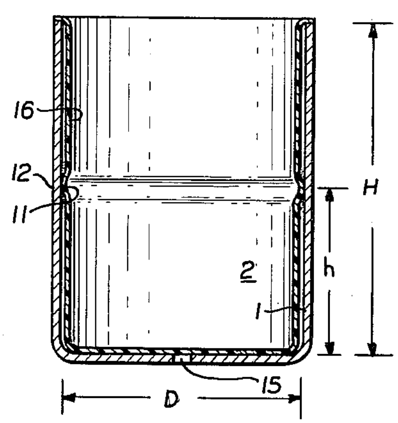
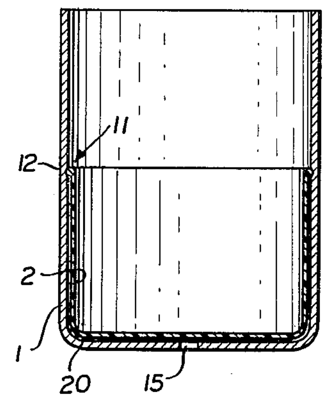
INVENTOR
SANTO W. MILITELLO
BY Roy C. Hopgood
ATTORNEY

BABY FOOD FEEDER

INVENTOR
SANTO W. MILITELLO
BY Roy C. Hopgood
ATTORNEY

United States Patent Office 3,206,054

Patented Sept. 14, 1965

3,206,054

BABY FOOD FEEDER

Santo W. Militello, 54 Wyoming Drive, Huntington Station, N.Y.

Filed Jan. 5, 1962, Ser. No. 164,479
9 Claims. (Cl. 215—11)

This invention relates to an improved baby food feeder which allows an infant to apply suction to a nipple and remove relatively solid food which is within the feeder.

My invention utilizes many elements which are conventional in the art, such as an outer casing and a nipple. I further use an inner container positioned within the outer casing to contain the solid food. The casing and the inner container have openings which communicate with the interior of the nipple to allow the food to egress when suction is applied. Between the nipple and the openings of the casing and container, I employ a valve means which opens when suction is applied.

Some of these elements are conventional. The conventional bottles are satisfactory only for liquid foods such as water, milk or juices but are not satisfactory when used with relatively solid infant foods such as strained vegetables, meats and fruits. The prior art feeders acceptable for liquid food allow only a predetermined quantity of air to enter into the container and the atmosphere is responsible for providing pressure to force the liquid through the nipple. However, air cannot effectively pass through the solid food to replace the volume of food removed.

An object, therefore, of my invention is to provide an improved baby food feeder in which an infant can apply suction to remove relatively solid food which is contained therein without using external means, such as a pumping device.

A further object of my invention is to provide an improved baby food feeder having an inner collapsible container which collapses when suction is applied to force or push relatively solid food through the nipple.

A still further object of this invention is to provide an improved baby food feeder in which relatively solid food may be placed in a container, whereby the infant, by applying suction, can feed himself substantially all of the food content.

Still another object of this invention is to provide an improved baby food feeder especially adapted for relatively solid food utilizing an inner collapsible container which is of a dimension to prevent the collapsing of parts located between the nipple and the base which would form an enclosed food pocket.

Yet still another object is to provide an improved baby food feeder having a sanitary packaging construction which may be easily removed.

Briefly, my invention includes an outer casing and a nipple. The casing may be made of a flexible, semi-rigid or rigid material such as plastic or glass, which materials now form conventional infant bottles. Such casing material may be easily gripped by the infant. Within this casing, I provide an inner container in which the relatively solid infant food is contained and a valve means just below the nipple and secured to the outer casing through which the food may pass. The valve means is opened when suction is applied. Suitable means are provided to allow air from the atmosphere to flow between the outer casing and the inner container at the lower part thereof so as to push the container upwardly when suction is applied at the nipple.

Further, and most important, at a predetermined location or peripheral band approximately half way along the length of the inner container, I provide means for preventing vertical or lateral movement thereof with respect to the adjacent section or band of the casing. In the preferred embodiment, only the bottom half of the inner collapsible container may move relative to the casing thereof which, as will be seen, insures that the food content will be eaten by the infant. My inner collapsible container has a diameter at the location where it is fixedly positioned relative to the outer casing which is substantially equal to or greater than the height of the collapsible container below this location.

I derive an advantage from my novel structure in that the food content of the collapsible bag may be substantially removed during the feeding without enclosed pockets of food being formed by the necking in of parts of the inner collapsible container. Further, my invention need not be utilized in the inverted position as is required when using the infant's bottle filled with liquid but may be used in any position.

Other objects and various further features of novelty and invention will become apparent or will occur to those skilled in the art from a reading of the following specification in conjunction with the accompanying drawings. In said drawings, which show, for illustrative purposes only preferred forms of the invention:

FIG. 1 is a cross-sectional view of the baby food feeder showing the inner collapsible container.

FIG. 2*a* is a cross-sectional view along 2—2 of FIG. 1.

FIG. 2*b* is a cross-sectional view along **2*b*—2*b*** of FIG. 2.

FIG. 3 is an alternative embodiment of the baby food feeder without the cover showing a snap ring attached to the collapsible bag.

FIG. 4 is another alternative embodiment of the baby food feeder showing the collapsible container secured to the outer casing by bonding means.

FIG. 5 is still another embodiment of the baby food feeder showing a different form of collapsible container without the cover.

Figure 6:
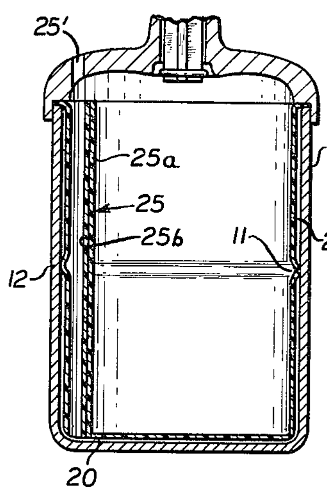
FIG. 6 is another alternative embodiment showing still another form of collapsible container without the nipple.

Referring now to the drawings, at FIG. 1, there is shown the preferred embodiment of a baby feeder which allows an infant to apply suction to a nipple and remove relatively solid food contained therein. The feeder comprises an outer casing 1, which may be formed of a relatively rigid material such as plastic or may be formed of inflexible material such as glass. Fur purposes of safety and convenience, plastic is preferred. Positioned within this casing is an inner collapsible container 2 formed of a flexible plastic film. The container is enclosed by the bottom section 18 but the container has an upper opening which conforms with the opening of the casing. In general, the collapsible container 2 as shown conforms with the inner surface of outer casing 1. Food 20' is shown within the collapsible container to fill the interior of the cover.

The upper part of the outer casing 1 is provided with an opening which receives a nipple 3 and through which food may egress. Positioned below nipple 3 and secured to outer casing 1 at the upper opening thereof is valve means 4 which opens when suction is applied. Collapsible container 2 also has an opening at the top thereof to communicate with the valve means so that when the valve is opened, food may flow directly into the nipple.

Referring now to FIGS. 2*a* and 2*b* as well as FIG. 1, one embodiment of the valve means comprises a fluted poppet valve 5 with an enlarged base shown as a snap ring 8' secured thereto which limits the upward travel of the valve. The downward travel is limited by shoulders 7 of the valve which rest on seats 8 formed into the upper casing 1. Valve 5 has a plurality of relatively wide longitudinal flutes 9 which extend from the lower end up to but not through the cover or top surface 6 thereof.

When the valve is in the lowermost position, cover 6 effectively prevents food from passing through flutes 9 into the interior of nipple 3. When suction is applied, valve 5 rises and flutes 9 communicate with the interior of nipple 3 allowing food to egress.

Referring back to FIG. 1, the inner collapsible container has a first section or band 11 which is positioned adjacent to a second section or band 12 of the outer casing at a predetermined location intermediate of said casing. The first section 11 of the collapsible container may be considered as a thin circumferential band (or edge) extending generally parallel to the bottom section of the container. The band is preferably thin, having the width of a string or a thin rubber band. Ideally, it has the dimension of the width of a line. The lower part of this thin band defines what may be considered as an edge and this edge will be referred to as a pivoting edge for reasons which will become apparent hereinafter.

Figure 10:
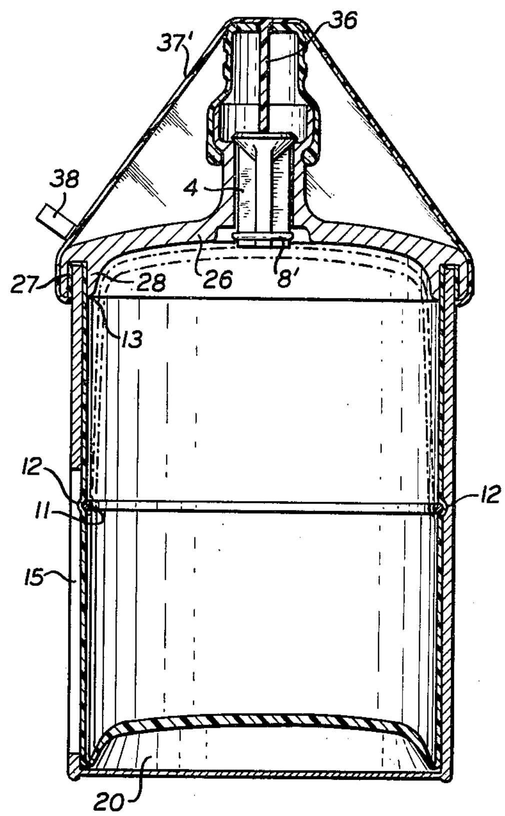
FIG. 10 shows the baby food feeder in a packaging construction.

In the embodiment shown at FIG. 1, the inner collapsible container comprises an upper part 16 and a lower part 17, the two parts being divided by the band 11. The container is secured to the outer casing at its upper part by joining means 13 which may be a chemical bond or a mechanical lock or restraint. The upper part 16 comprises a relatively resilient sleeve which is not collapsible, as compared with the lower part 17 which is a completely flexible film having a relatively low plastic memory. The band 11 is fixed in position to prevent primarily vertical but also lateral displacement relative to the second section 12 of the casing 1. In this embodiment, the bottom edge of the sleeve is band 11. Preferably, the lower part is formed of a thin, pliable plastic film such as cellophane, polyethylene, polyvinyl chloride or the like. This film yields in response to applied air pressure. The upper and lower parts 16 and 17 may be joined together to form a continuous surface or alternatively may be one piece. However, the region at which they are joined will be the above described first section or band 11. An air space or vent 15 is formed in the outer casing at a location which is adjacent a selected region of the lower part of the collapsible container 17. As shown, the bottom 18 of the collapsible container and the walls of the outer casing form a chamber 20 which communicates with atmosphere through vent 15. As shown in FIG. 10, the vent 15 may be formed as a long narrow upright slot in the longitudinal wall of the casing through which the amount of food remaining in the inner container may be viewed.

As suction is applied, the air entering chamber 20 bears on the lower part of the collapsible container 16 and forces it upwardly which in turn forces the relatively solid food through the valve means 4 to the nipple 3.

In an important aspect of this invention, the distance between band 11 and the bottom 18, which is called *h*, is less than the diameter or the width of the collapsible container at the band section. It is understood that I contemplate casings and inner containers having non-circular cross-sections, such as square, rectangular and other polygonal cross-sections. For convenience, I refer to the diameter as being the distance between diametrically opposed walls at the smallest diametric distance. The overall height H, therefore, of the collapsible container is chosen to equal substantially twice *h*. These dimensions allow practically all of the relatively solid food (as opposed to liquid food) to pass through the nipple.

Figure 8:
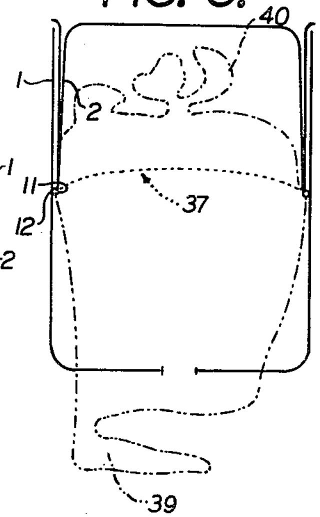
FIG. 8 is an illustration in schematic form showing the position of the collapsible container after the food has been removed.

When the overall height H is approximately equal to twice *h*, the outer surface of the lower part 17 will be equal to and substantially conform to the inner surface of the upper part 16 of the collapsible container. This condition is shown schematically at FIG. 8. Of course, a very small residue of food 20 may remain in the feeder as shown. If the height of the upper part of the collapsible container 16 is greater than the height of the lower part *h* then the surface of the lower part will not conform to that of the upper parts as shown by the dotted lines 37 in FIG. 8. In this condition, there will be a relatively big volume or gap between the bottom surface 18 and the lower part of the valve means, which volume will contain food which cannot be removed by suction.

It is important that the width or diameter D of the collapsible container be greater than the height of the lower part *h* in order to prevent the left and right sides of the lower part 17 from necking together to completely enclose a quantity of food and form a pocket. This condition is shown by the dotted lines 39 in FIG. 8. If the diameter is greater than the dimension *h* then it will be impossible for the sides to meet and the necking-in effect will be removed as suction is increased.

Further, if the height *h* is substantially greater than the height of the upper part, then it will be possible for the sides of the lower part of the collapsible container 17 to neck together in similar fashion once the bottom part 18 is within the region defined by the upper part of 16 as shown by the dotted lines 40.

An alternative embodiment of the feeder is shown in FIG. 3. The outer casing is similar to that shown in FIG. 1 except that the second band section 12 is formed as an inner circumferential groove 24 within the inner surface of casing 1; the band 11 of the collapsible container is formed as a snap ring 23 joined circumferentially to the plastic film which is received in the groove 24. In this manner, the band 11 is fixed in position relative to the band section 12. Although as shown in FIG. 1 the bottom 18 may be relatively stiff, as shown in FIG. 3 the bottom is completely flexible. The relatively stiff bottom is not necessary but may be used in any of the embodiments. The air vent 15 is provided in the outer casing 1 to function in a manner heretofore described.

The embodiment of FIG. 4 is generally similar to that of FIG. 1 except that the inner collapsible container is completely flexible at its upper and lower parts. The band section 11 is formed as an adhesive bond joined to band section 12. While the adhesive means used may be cement, plastic fusion may be utilized to effect the joint. Again, the band section 11 cannot move longitudinally with respect to the band section 12.

As shown in FIG. 5, only the lower part of the collapsible container or "half bag" is used and the band 11 of the collapsible container may be joined to casing 1 in any manner as heretofore described, such as with an adhesive joint or by a snap ring. In this embodiment, the inner wall of casing 1 above the band section 11 functions in the same manner as the upper part of the collapsible container 16.

Figure 7:
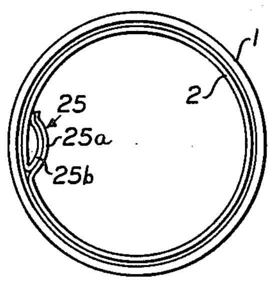
FIG. 7 is a cross-sectional plan view along 7—7 of FIG. 6.

In the embodiment of FIG. 6, the air vent is eliminated from the outer casing so that the outer casing is continuous and closed except for the upper opening. As stated above, the chamber 20 is defined by the adjacent surfaces of the collapsible container and casing. The container is provided with a tube 25 having openings at both ends which openings communicate respectively with chamber 20 and with atmosphere. Tube 25 has sufficient structural rigidity so as to remain relatively firm and does not collapse as the collapsible container is pushed up. This may be achieved by the double wall construction shown in FIG. 7 where the end **25*b* overlaps folded over end 25*a***. The ends are held together by conventional securing means such as an adhesive or a fusion bond. Alternatively, one end 25*b* may be made longer than an end 25*a* and may be wrapped upon itself a plurality of times in helical fashion defining a center space, the wrappings being suitably secured together. An aperture 25′ may be provided in the top cover as shown in FIG. 6 to allow tube 25 to communicate with atmosphere. If desired, suitable surrounding means may be placed between the end of tube 25 and aperture 25′ to prevent food from clogging the tube or the aperture or the walls of tube 25 may be extended to fit into aperture 25′.

While the nipple and valve means may be made integral with the baby feeder, the invention contemplates the use of a top cap or cover which is detachably mounted at the upper casing which cover may contain the nipple and valve means. The feeder casing is secured to the cap in a conventional manner as by threading or allowing the cap to be screwed on and off.

Figure 9:
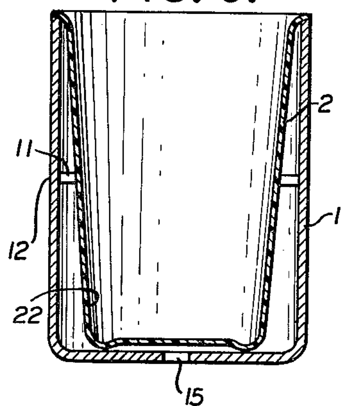
FIG. 9 is another embodiment showing the collapsible container without the cover and with tapered sides.

The embodiment shown in FIG. 9 is similar to the other embodiment except the sides of the container are tapered. The band section 11 cannot move longitudinally with respect to band section 12. This may be accomplished by using a sleeve as shown in FIG. 1, or the snap ring of FIG. 3 or the adhesive of FIG. 4.

The joining means 13 which joins the collapsible container 2 to the outer casing 1 may take any of various forms and as shown in FIG. 10, comprises a flap extension 27 of the container 2 which is bent up and over the top edge of the casing 1. The cover 26 has circumferential depending lips 28 which fit over the top edge of the casing to clamp the collapsible container to the casing.

Figure 11:
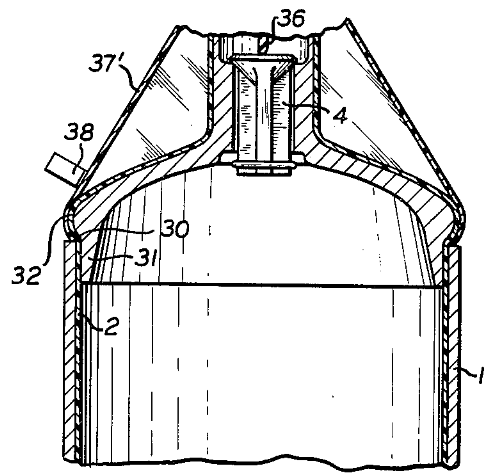
FIG. 11 shows an alternative embodiment for securing the collapsible container to the outer casing.

Alternatively, a press fit as shown in FIG. 11 may be utilized. In this type of joint, the detachable cover 26 encloses a circumferential depending edge or lip 31, the outer diameter 32 of which is slightly greater than the inner diameter of the casing at the upper edge thereof. The extension or flap 30 of the collapsible container extends a sufficient distance so that it is gripped between the lip 31 and the upper part of the casing 1 when the cover is pressed into position.

In another aspect of this invention, a sanitary packaging is utilized as shown in FIG. 10, in which the detachable cover 26 is enclosed by a hermetic seal 37′ which presses down on a thorn or pin 36 to retain the valve in a closed position. A tear-off tab 38 extending substantially circumferentially along the hermetic seal is provided. This tab may be removed by application of a force to detach completely the hermetic seal 37.

The embodiments disclosed are only by way of example and other embodiments and advantages will appear to those skilled in the art.

I claim:

1. In a baby food feeder, the invention comprising
an outer casing having an opening therein,
an inner container positioned within said casing and having an opening therein communicating with the opening of said casing,
a first relatively thin circumferential outer band surface section of said container being positioned adjacent a second circumferential inner band surface section of said casing,
said second circumferential inner band surface section of said casing being intermediate the length thereof,
said first band section being substantially fixed in position relative to said second band section,
the part of said container below said first band section being collapsible and movable with respect to said casing, whereby said part may fold about said first band section,
said casing and container below said band section defining a chamber therebetween,
air space means in said outer casing communicating with atmosphere and said chamber, whereby air entering said air space means bears against the said part of said container below the said first section,
a snap ring, said inner container being joined to said outer casing at said band sections by means of said snap ring,
said casing having a complementary recess to receive said snap ring.

2. In a baby food feeder, the invention comprising,
an outer casing having an opening therein,
an inner container positioned within said casing and having an opening therein communicating with the opening of said casing,
a first relatively thin circumferential outer band surface section of said container being positioned adjacent a second circumferential inner band surface section of said casing,
said second circumferential inner band surface section of said casing being intermediate the length thereof,
said first band section being substantially fixed in position relative to said second band section,
the part of said container below said first band section being collapsible and movable with respect to said casing, whereby said part may fold about said first band section,
said casing and container below said band sections defining a chamber therebetween,
air space means in said outer casing communicating with atmosphere and said chamber, whereby air entering said air space means bears against the said part of said container below the said first section, the height of the lower part of said container being less than the diameter of said container at the said band sections.

3. The baby food feeder of claim 2 in which the height of the said container is substantially equal to twice the height of the lower part.

4. In a baby food feeder, the invention comprising
an outer casing having an opening therein,
an inner container positioned within said casing and having an opening therein communicating with the opening of said casing,
a first relatively thin circumferential outer band surface section of said container being positioned adjacent a second circumferential inner band surface section of said casing,
said second circumferential inner band surface section of said casing being intermediate the length thereof,
said first band section being substantially fixed in position relative to said second band section,
the part of said container below said first band section being collapsible and movable with respect to said casing, whereby said part may fold about said first band section,
said casing and container below said band sections defining a chamber therebetween,
air space means in said outer casing communicating with atmosphere and said chamber, whereby air entering said air space means bears against the said part of said container below the said first section, said collapsible container being a half-bag construction, the edge of which forms the band sections of said container.

5. In a baby food feeder, the invention comprising
an outer casing having an opening therein,
an inner container positioned within said casing and having an opening therein communicating with the opening of said casing,
a first relatively thin circumferential outer band surface section of said container being positioned adjacent a second circumferential inner band surface section of said casing,
said second circumferential inner band surface section of said casing being intermediate the length thereof,
said first band section being substantially fixed in position relative to said second band section,
the part of said container below said first band section being collapsible and movable with respect to said casing, whereby said part may fold about said first band section, said casing and container below said band sections defining a chamber therebetween, air space means in said outer casing communicating with atmosphere and said chamber, whereby air entering said air space means bears against the said part of said container below the said first section, said outer casing including a detachable cap, a nipple secured to said detachable cap, valve means seated in the said opening of said detachable cap in communicating relationship with said nipple, a pin in the aperture of said nipple to keep said valve means closed, and a hermetic seal completely enclosing the detachable cap and retaining the pin in position, said hermetic seal including tab means to open said seal.

6. In a baby food feeder, the invention comprising an outer casing having an opening therein, an inner container positioned within said casing and having an opening therein communicating with the opening of said casing, a first relatively thin circumferential outer band surface section of said container being positioned adjacent a second circumferential inner band surface section of said casing, said second circumferential inner band surface section of said casing being intermediate the length thereof, said first band section being substantially fixed in position relative to said second band section, the part of said container below said first band section being collapsible and movable with respect to said casing, whereby said part may fold about said first band section, said casing and container below said band sections defining a chamber therebetween, air space means in said outer casing communicating with atmosphere and said chamber, whereby air entering said air space means bears against the said part of said container below the said first section, said air space means comprising a tube communicating with atmosphere at one end, the other end communicating with the chamber between the outer casing and inner container at the lower part thereof.

7. A baby food feeder comprising an outer casing having an opening therein through which food may egress, an inner container, nipple means including a suction valve means therein secured to said outer casing at the opening thereof, said valve means being opened in response to suction applied to said nipple means, means for restraining the movement of said inner container relative to said outer casing at a perimetric section thereof located intermediate the length, said inner container being free of restraint below said perimetric section, whereby a chamber is defined between said outer casing and said inner container located below said perimetric section, and an air space means in said outer casing communicating with said chamber, said inner container below said perimetric section being collapsible and movable with respect to said casing, the shortest distance between opposed walls of said inner container at said perimetric section is substantially equal to or greater than the effective height of said inner container located below said perimetric section, and said restraining means includes a snap ring fitting into a complementary recess in the casing at said perimetric section.

8. A baby food feeder comprising an outer casing having an opening therein through which food may egress, an inner container, nipple means including a suction valve means therein secured to said outer casing at the opening thereof, said valve means being opened in response to suction applied to said nipple means, means for restraining the movement of said inner container relative to said outer casing at a perimetric section thereof located intermediate the length, said inner container being free of restraint below said perimetric section, whereby a chamber is defined between said outer casing and said inner container located below said perimetric section, and an air space means in said outer casing communicating with said chamber, said inner container below said perimetric section being collapsible and movable with respect to said casing, the shortest distance between opposed walls of said inner container at said perimetric section is substantially equal to or greater than the effective height of said inner container located below said perimetric section, and said restraining means including a sleeve being stiffer than said inner container and positioned adjacent the interior of said inner container, the lower edge of said sleeve being positioned at said perimetric section.

9. A baby food feeder comprising an outer casing having an opening therein through which food may egress, an inner container, nipple means including a suction valve means therein secured to said outer casing at the opening thereof, said valve means being opened in response to suction applied to said nipple means, means for restraining the movement of said inner container at a perimetric section thereof, said inner container being collapsible and free of restraint below said perimetric section, whereby a chamber is defined between said outer casing and said inner container located below said perimetric section, air space means in said outer casing communicating with said chamber, the shortest distance between diametrically opposed walls of said inner container at said perimetric section being substantially equal to or greater than the effective height of said inner container located below said perimetric section, said air space means comprising a tube communicating with atmosphere at one end and the other end communicating with the said chamber.

References Cited by the Examiner

UNITED STATES PATENTS

| | | | |
|---|---|---|---|
| 2,628,913 | 2/53 | Horan | 215—11 |
| 2,815,152 | 12/57 | Mills | 220—85 |
| 2,987,209 | 6/61 | Leonard | 215—11 |

FOREIGN PATENTS

| | | |
|---|---|---|
| 1,076,532 | 10/54 | France. |

JOSEPH R. LECLAIR, *Primary Examiner.*

THERON E. CONDON, EARLE J. DRUMMOND, FRANKLIN T. GARRETT, *Examiners.*